United States Patent Office 3,480,858
Patented Nov. 25, 1969

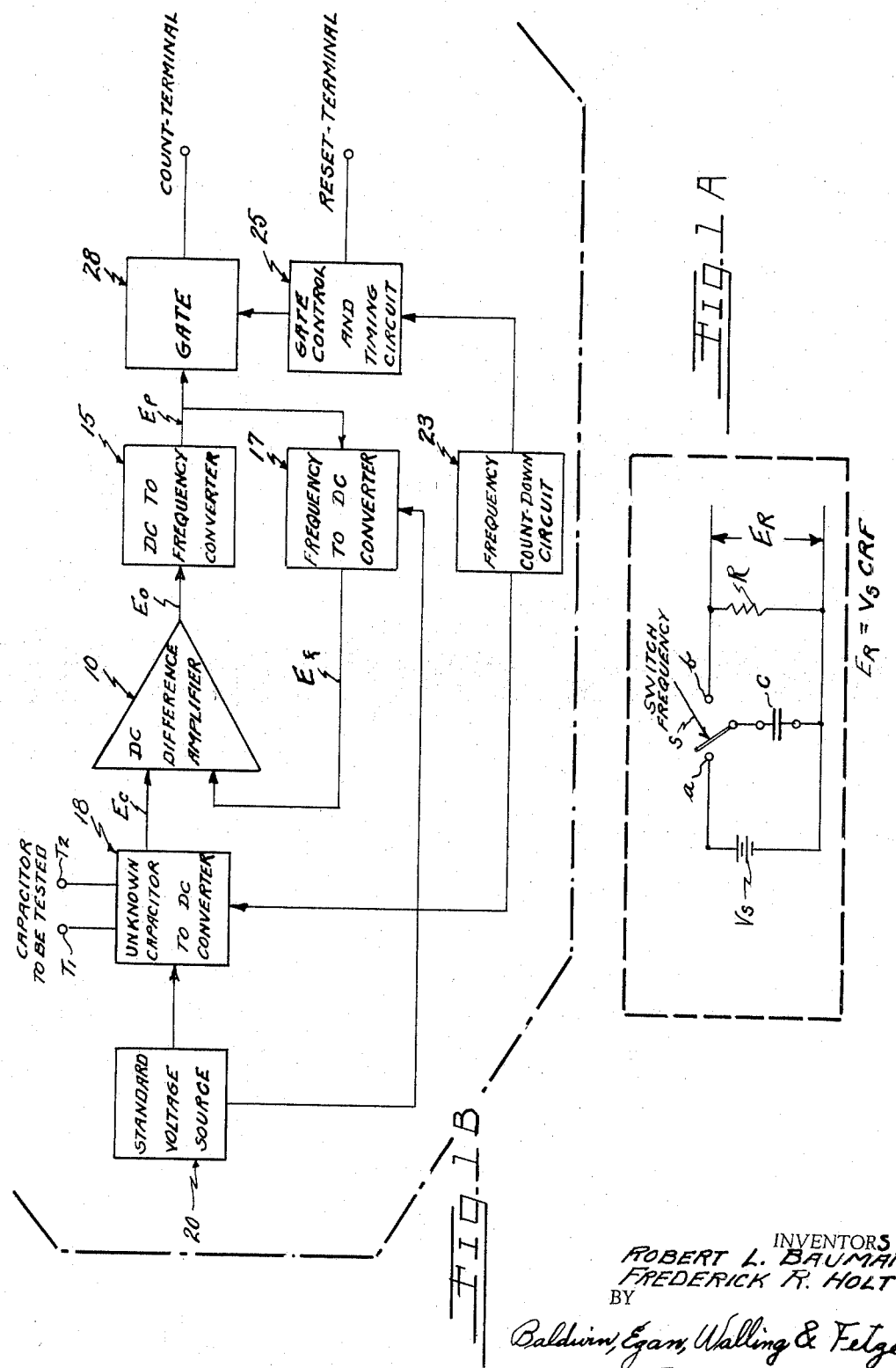

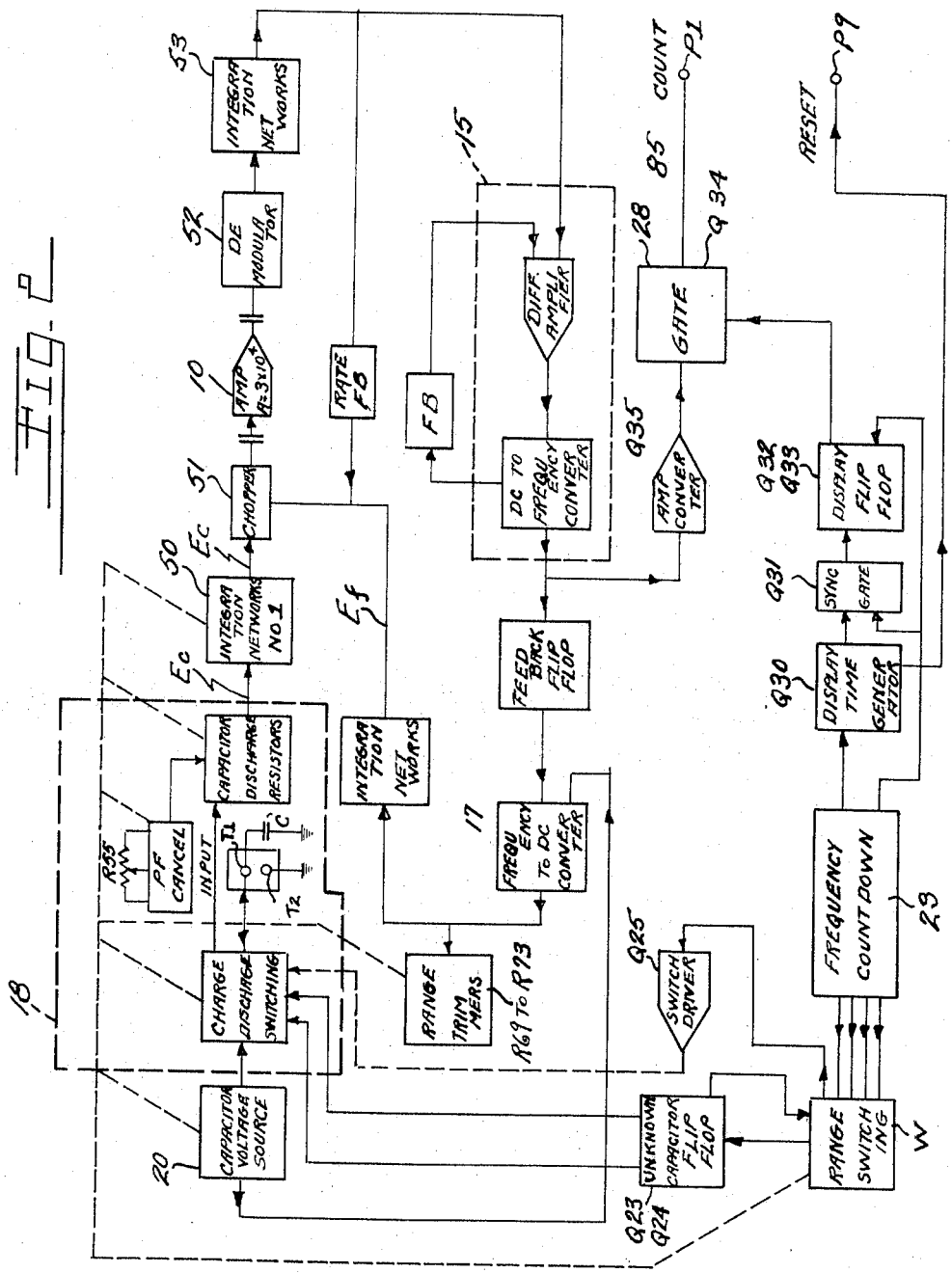

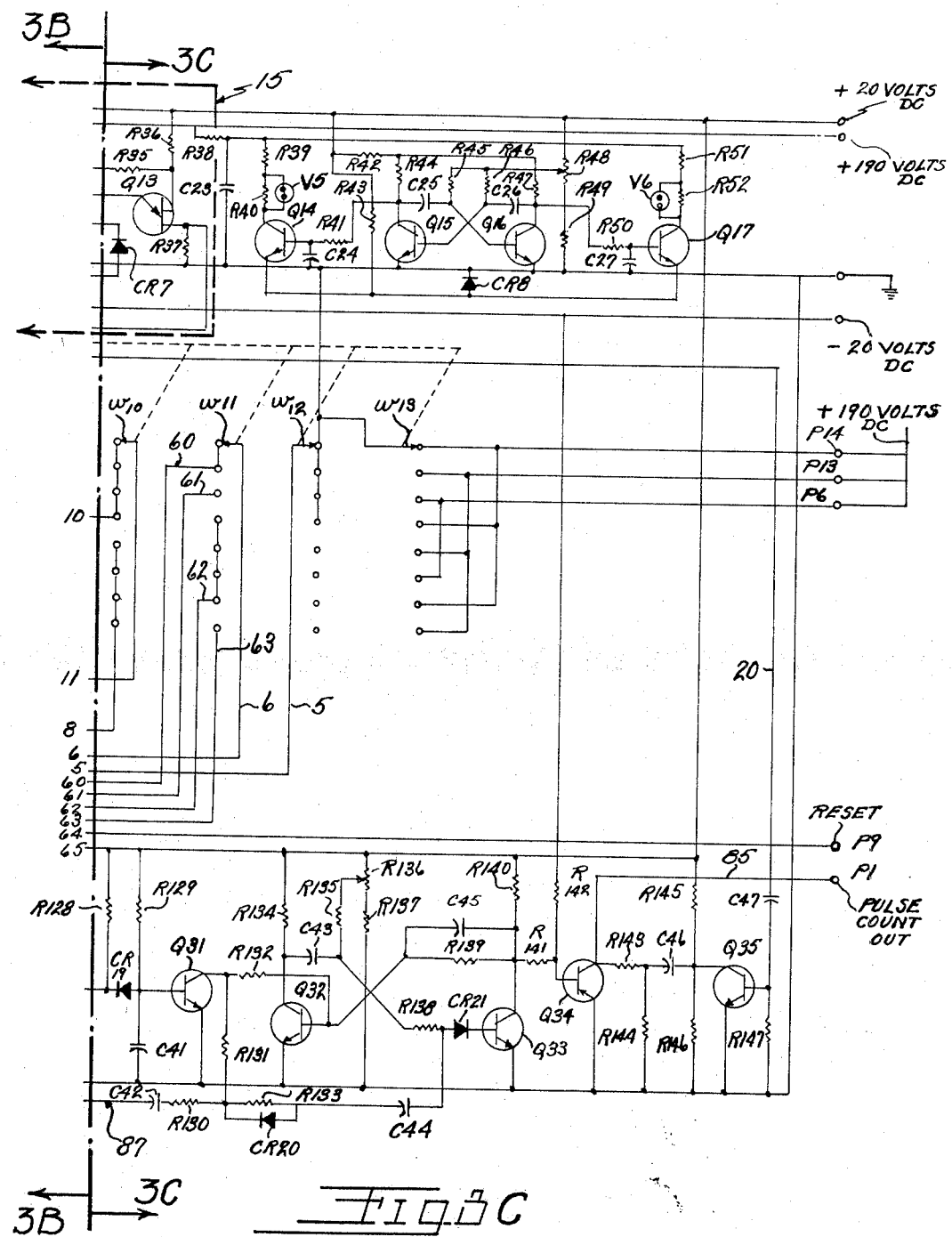

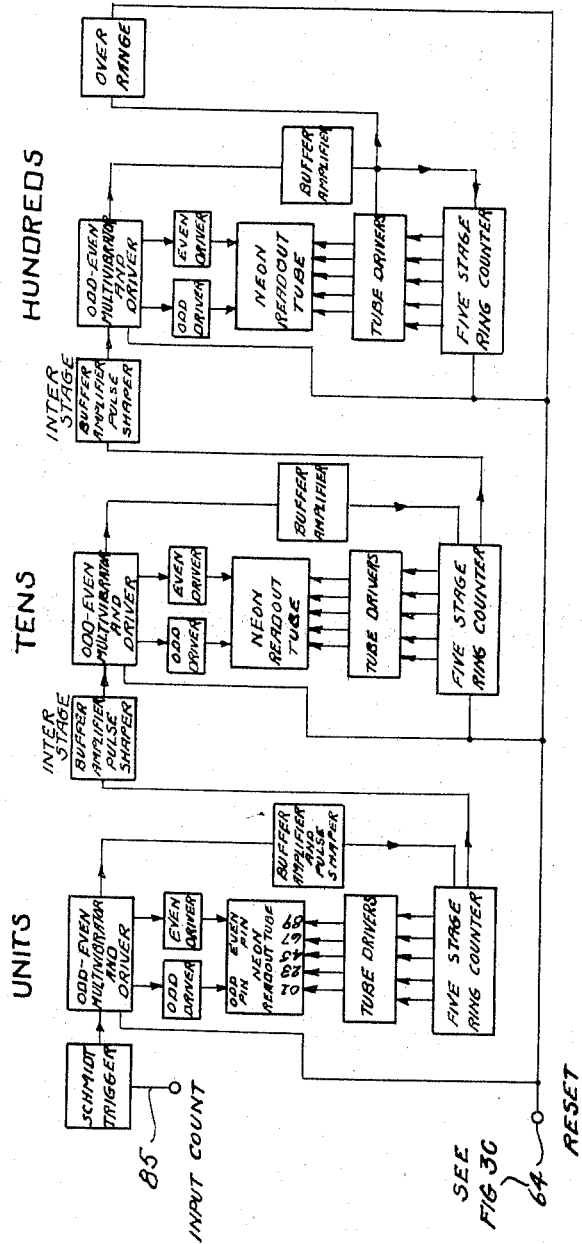

3,480,858
DIGITAL CAPACITY MEASURING INSTRUMENT INCLUDING A DIFFERENCE AMPLIFIER AND A DIRECT CURRENT-TO-FREQUENCY CONVERTER
Robert L. Bauman, Cleveland Heights, and Frederick Rodney Holt, East Cleveland, Ohio, assignors to The Hickok Electric Instrument Company, Cleveland, Ohio, a corporation of Ohio
Filed Feb. 21, 1968, Ser. No. 707,083
Int. Cl. G01r 27/26
U.S. Cl. 324—60                                 10 Claims

ABSTRACT OF THE DISCLOSURE

The digital capacitor instrument converts a direct current signal that is proportional to the value of the capacitor under test into a burst of pulses wherein the number of pulses in the burst is precisely equal to the magnitude of the capacitor under test. The pulse burst is applied to a digital counter and display device wherein it is counted and visually displayed.

---

This invention relates generally to a digital type of measuring instrument and more particularly to a digital instrument especially designed to directly measure the value of capacitance.

This digital measurement is accomplished by producing a direct current voltage that is proportional to the value of the capacitance under test which voltage is applied to and converted in the instrument circuitry into a burst of pulses wherein the number of pulses in the burst is precisely equal to the magnitude of the capacitance.

As merely one application the electronic circuit of the present invention is particularly applicable for use with the digital counter and readout unit commercially known as the Hickok Model DMS–3200 Main Frame which is manufactured by The Hickok Electrical Instrument Company of Cleveland, Ohio.

When used with this counter and readout unit or equivalent, the electronic circuit of the present invention is operable to convert a direct current voltage representing the magnitude of the capacitance under test into a pulse train or burst wherein the number of pulses in the burst is precisely equal to the magnitude of the unknown capacitance. This pulse burst is then applied to the digital counter and readout device which counts the number of pulses and visually displays the numeral summation thereof thus giving a highly accurate visual display of the actual value of magnitude of the capacitance under test.

In its present day use, the instant electronic circuit as incorporated into a digital capacitor test instrument is capable of providing a digital measurement of capacitances within the range of 0 to 10,000 microfarads within an accuracy of 0.02% including effects of ambient temperature changes, line voltage variations and line frequencies between 47 c.p.s. to 400 c.p.s.

It is therefore a primary object of the present invention to provide an electronic digital instrument circuit capable of directly measuring the value of capacitance.

Another object of the present invention is to provide an electronic instrument circuit especially designed to convert a direct current voltage representing the magnitude of a capacitance under test into a burst of pulses wherein the number of pulses in the burst is precisely equal to the magnitude of the capacitance.

Still another object of the present invention is to provide an electronic instrument circuit which is especially designed to provide an output digital signal that is precisely equal to the magnitude of a capacitance under test and which circuit includes a direct current-to-frequency converter that generates a pulse train whose frequency is approximately proportional to the magnitude of voltage applied thereto, a highly precise frequency-to-direct current converter coupled to said direct current-to-frequency converter and whose output is proportional to the product of a predetermined reference voltage and the frequency of the signal applied thereto, a difference amplifier which is coupled to the capacitance under test and the output of the frequency-to-direct current converter; the gain of the amplifier being relatively high and coupled to said direct current-to-frequency converter whereby the output of the frequency-to-direct current converter is a value that, within very precise limits, is very nearly equal to the magnitude of the capacitance under test.

Other objects and advantages of the electronic digital circuit of the present invention will be apparent to one skilled in the art to which it pertains and upon reference to the following description of a preferred embodiment thereof and which is illustrated in the acompanying drawings wherein:

FIG. 1A is a circuit diagram to illustrate the electrical principle upon which the instrument of the present invention is based;

FIGURE 1B is a simplified block diagram of the digital electronic circuit of the instrument of the present invention and also illustrating the several signal waveforms which appear at the various portions of said circuit;

FIGURE 2 is a block diagram of the complete circuit incorporated in the digital electronic instrument of the present invention;

FIGURES 3A, 3B and 3C are schematic wiring diagrams of the complete digital electronic circuit shown in FIGURE 2; and FIGURE 4 is a schematic diagram of the Hickok counter and readout device Model DMS–3200 to which the digital capacitor instrument of the present invention may be connected to effect a digital visual display of a capacitance value.

Figure 3A:
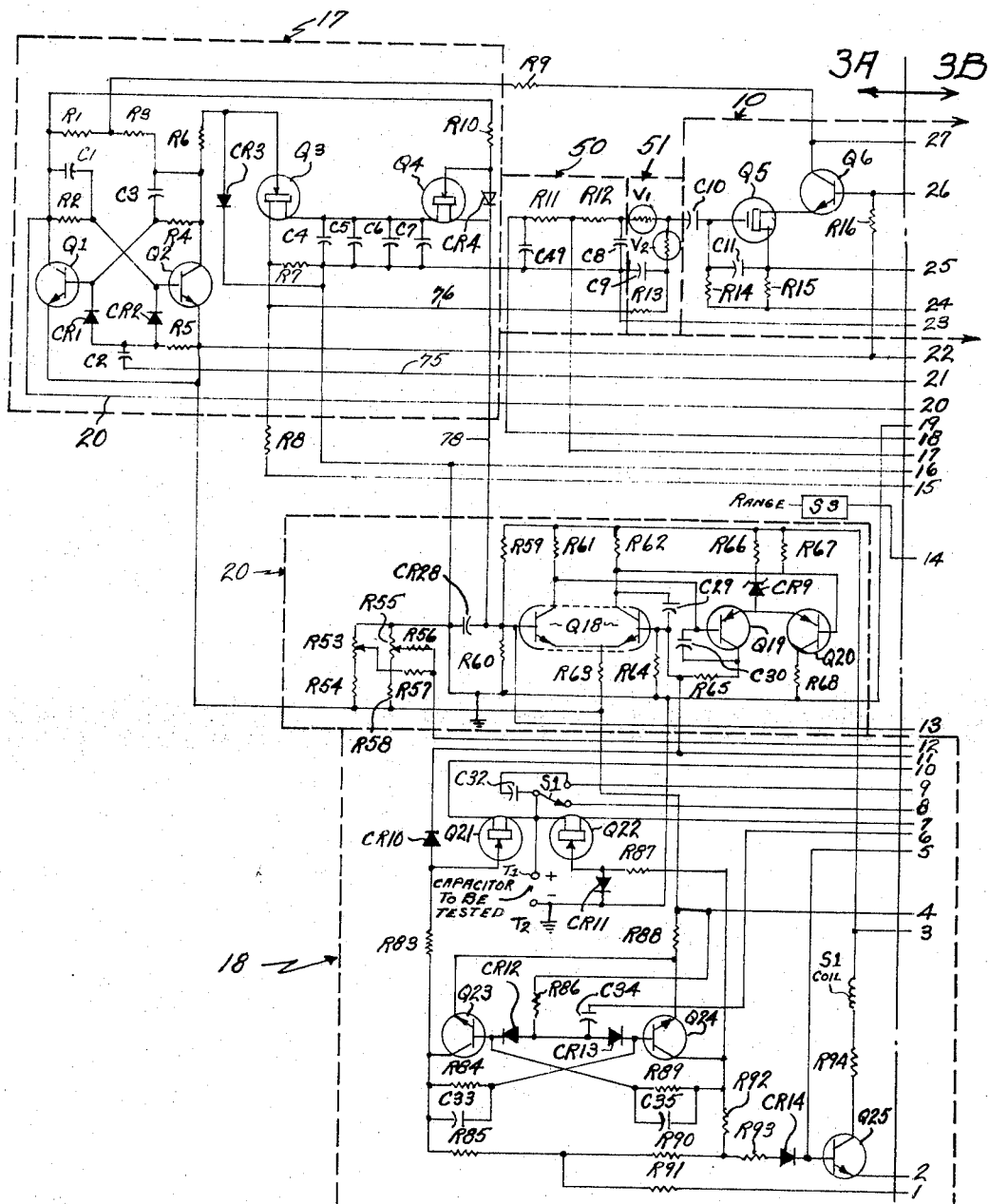

Briefly, the basic principle upon which the present digital instrument is constructed to provide a digital indication of a value of capacitance of unknown magnitude will be understood with reference directed to the circuit diagram shown in FIG. 1A.

As will be understood in the art, in the circuit of FIG. 1A, the capacitor C will alternately charge and discharge as the switch S is alternately moved to its $a$ and $b$ positions, respectively. With a known value of source voltage $V_s$, it can be shown that the voltage ($E_r$) across the resistance R will have a value according to the formula, $E_r = RCV_sF$ where:

R is the value of the resistor
C is the value of the capacitor under test
V is the source voltage
F is the frequency at which the switch S alternately moved to its $a$ and $b$ positions.

As will be understood, if it is desired to obtain a certain value of voltage $E_r$ across the resistor R, as for example 50 millivolts, and with a given value of source voltage $V_s$, the value of the capacitor C to provide this voltage $E_r$ can be determined if the values of the resistor and the frequency F are also known.

Likewise, with the parameters (R, $V_s$ and F) established, with capacitor C, the value of any capacitor can then be determined by correspondingly changing the value of the resistor R or the frequency F whereby to obtain the same value of $E_r$. As for example, if a capacitor ten times larger than C is to be measured, either the frequency F or the resistor R can be divided by ten (10) to obtain the same value of $E_r$, as the 50 millivolts in the aforesaid example.

As will become hereinafter more apparent, the digital instrument of the present invention incorporates this basic circuit principle in accomplishing its intended function, that is to measure and provide a digital measurement of capacitance.

With reference now directed to FIGURE 1B the digital electronic circuit of the present invention, as shown in this simplified block diagram, is seen to include a direct current difference amplifier 10 to which two voltages $E_c$ and $E_f$ are applied to its input. A direct current-to-frequency converter 15, whose input is connected to the output of the amplifier 10, is connected at its output in turn to a frequency-to-direct current converter 17 the latter connected between the output of said converter 15 and the input of the difference amplifier 10. Converter 17 generates the aforementioned voltage $E_f$ which acts as a feedback voltage.

A converter 18, defined hereinafter as the unknown capacitor-to-direct current converter, generates the direct current voltage $E_c$ which is representative of the magnitude of the capacitor under test. This voltage $E_c$ corresponds to the voltage $(E_r)$ in FIG. 1A and is applied to the input of the difference amplifier 10 wherein it is mixed with voltage $E_f$ which is also a direct current voltage and the same polarity as voltage $E_c$.

Voltage $E_f$, which is generated by converter 17, is proportional to the product of a standard voltage source 20 and the frequency of the signal output of converter 15. The proportionality of said voltage $E_f$ with the values of circuit components, as are hereinafter catalogued, is within approximately ±0.01%.

The voltage $E_f$ is applied to the input of the difference amplifier 10 wherein the voltage difference $(E_c - E_f)$ is amplified and inverted to define an output voltage $E_o$ which is applied to the input of the direct current-to-frequency converter 15.

This converter 15 generates a pulse train $E_p$ whose frequency is approximately proportional to the magnitude of the voltage $E_o$, and which pulse train is applied to the frequency-to-direct current converter 17 which is constructed to be highly precise in its conversion function.

As aforementioned, the output signal of the converter 17 is a direct current voltage $E_f$ which is proportional to the standard voltage source 20 and the frequency of the pulse train $E_p$.

By making the gain of the difference amplifier 10 substantially high, as for example $3 \times 10^4$ $(E_c - E_f)$ voltage $E_f$ will be very nearly equal to voltage $E_c$ and consequently the frequency of the pulse train will be held proportional to voltage $E_c$ (representing the magnitude of the capacitor under test) to within a few parts in ten thousand.

The voltage $E_c$ is generated by converter 18 and is proportional to the size of the capacitor C under test.

The caapcitor C is inserted into a switching circuit which is part of the converter 18 and is alternately charged and discharged therein. Capacitor C is connected to the standard voltage source 20 and is charged thereby and then disconnected from said source and connected across a resistor R of selected magnitude whereby said capacitor is discharged.

The average voltage across resistor R represents voltage $E_c$.

With the values of the components comprising the instant configuration of instrument circuitry the voltage $E_c$ is proportional to the value of capacitor C to within ±0.02%. As will be hereinafter more apparent, the operational range of the instrument circuitry for measuring a wide range of values of capacitance may be adjusted by selecting various sizes of the resistor R and/or changing the frequency of the converter 18.

Comparing FIGS. 1A and 1B, the standard voltage source 20 in FIG. 1B corresponds to the voltage source $V_s$ in the diagram of FIG. 1A and in like manner, the converter 18 contains the switching circuitry corresponding to switch S in FIG. 1A.

The standard voltage source 20, as seen in FIG. 1B, supplies operating voltage for both converter 18 and the frequency-to-direct current converter 17. With this circuit connection as will be hereinafter more understood if the level of the voltage source 20 changes it will effect the operation of both converters 17 and 18 in such manner that no change will occur thereby in the difference voltage $E_c - E_f$. And, with no change in the voltage difference $E_c - E_f$ there will be no consequent change in the output pulse train $E_p$ of converter 15.

The charge-discharge rate of the capacitor under test is determined by the frequency countdown circuit identified at 23 which is connected to both the converter 18 and a gate control and timing circuit 25.

If the frequency of this countdown circuit 23 has a tendency to change or drift, its operation with the converter 18 and gate control and timing circuit 25 is such as to cause opposite effects therein whereby to balance or cancel out said frequency change or drift.

To accomplish this the gate control and timing circuit 25 is connected to the frequency countdown circuit 23 and is operable by a signal from said circuit to selectively open and close a gate 28.

The gate 28 is seen to be connected to the output of the direct current to frequency converter 15 wherefrom it receives the voltage or pulse burst $E_P$. Gate 28 is also connected to the "count terminal" of the readout and display instrument as for example the Hickok Model DMS–3200 Main Frame as aforementioned, whereupon the pulse burst $E_P$ passed by said gate is applied and digitally tabulated in said readout instrument.

The number of pulses in burst $E_P$ represents the magnitude of the capacitor C under test and by regulating the opening of gate 28 for a carefully controlled period of time the number of pulses in the burst can be made to be precisely proportional to the magnitude of the said capacitor under test.

If the frequency of the frequency countdown circuit 23 increases, the value of voltage signal $E_c$ will also increase, thereby increasing the frequency of the output pulse train $E_p$. However, an increase in frequency of the frequency countdown circuit will shorten the duration of time the gate 28 is open, thus reducing the time in which pulses can enter the readout and display instrument. Hence, the two effects balance one another such that the number of pulses entering the display instrument remains constant for a given capacitor C under test.

As will be hereinafter described in greater detail, the gate control and timing circuit 25 also produces a single pulse just prior to opening the gate 28, which pulse is applied to the "Reset" terminal of the digital counter and display instrument whereby it is reset to zero count at the beginning of each count of measuring cycle thereby enabling said instrument to accurately count the pulses in each succeeding pulse burst signal $E_p$.

Figure 3B:
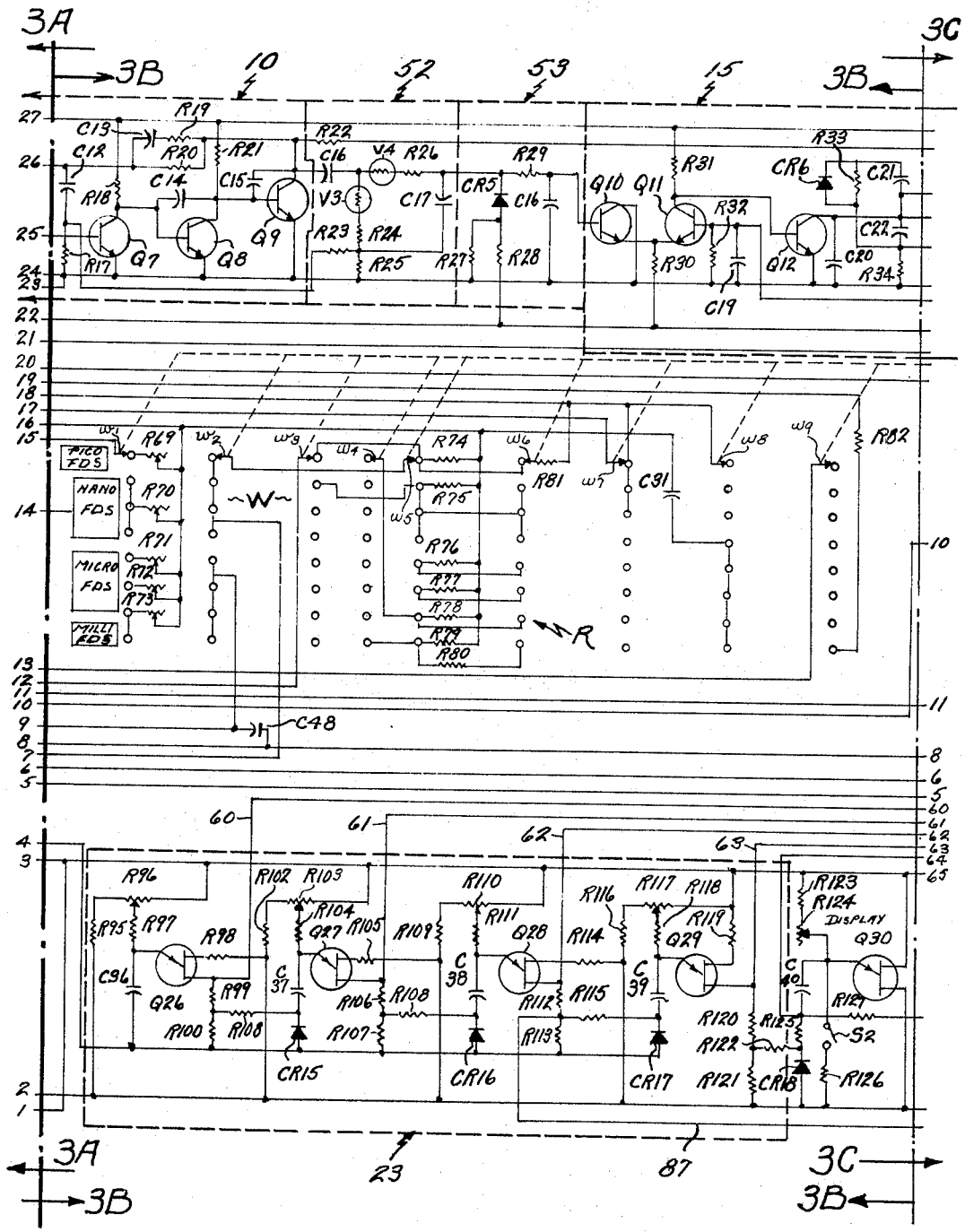

With reference now directed to the complete block diagram of FIG. 2 and its associated circuit schematic of FIGS. 3A, 3B and 3C, the capacitor C to be tested is connected across the plus and minus terminals $T_1$ and $T_2$ which comprise the input to the converter 18 in the instant digital capacitor test instrument.

The capacitor under test is cyclically charged from a standard voltage source that is of substantially constant magnitude and thereafter discharged through a resistor which is selected from the resistor bank R as identified in FIG. 3B.

For this purpose, the capacitor charging or voltage source as identified is seen to include a high gain two stage differential feedback amplifier comprising transistors Q18, Q19 and Q20 and associated circuitry connected to a suitable direct current voltage supply provided for the instrument such as plus (+) 20 volts shown at terminal $P_3$ in FIG. 3C.

This voltage supply may be provided in the aforementioned Hickok Model DMS–3200 counter and readout instrument into which the present instrument is adapted to be inserted and connected.

The identification and value of each component in the differential amplifier and for each circuit stage in the present instrumet hereinafter described is listed hereinafter and merely identifies one embodiment of value of circuit components for use in practicing the invention incorporated in the instant capacitor test instrument.

The capacitor C to be tested, as best seen in FIG. 3A, is connected across the output of differential amplifier Q18 and is charged thereby over a period of time or at a frequency which is determined by the switching element corresponding to S in the schematic of FIG. 1A.

In the instant circuit structure this switching element may either be a reed relay S1 or a pair of FETS identified as Q21, Q22 in FIG. 3A.

The instrument circuitry is seen to include a multideck, switch W, FIGS. 3B, 3C, which is provided with thirteen rows (1–13) of stationary vertical spaced contacts and a wiper contact w which has thirteen corresponding contacts ($w1$–$w13$) adapted to selectively engage a stationary contact in each row. As seen the wiper contacts are in engagement with the upper stationary contact in each of said rows, which position as seen in FIG. 3B is identified by the legend "Pico FDS" which is the range for measuring the smallest magnitude of capacitance.

As is also seen in FIG. 3B, the remaining progressive ranges for the instrument are identified by the legends "Nano FDS"; "Micro FDS" and "Milli FDS".

The "Nano FDS" and "Milli FDS" ranges are each seen to have three switch positions, and the "Pico FDS" and "Milli FDS" ranges each a single switch position.

With the switch in either the "Pico FDS" or "Nano FDS" positions the Fets Q21, Q22 are used as the switching element whereas the reed relay S1 is used in the "Micro FDS" or "Milli FDS" switch positions.

As seen in FIG. 3A, the positive (+) terminal $T_1$ to which the capacitor C is connected, is connected, in turn, to the junction between the series connected drain and source electrodes of Fets Q21, Q22. The source electrode of Fet Q21 is connected by conductor 10 to the upper four stationary contacts in the tenth row of contacts in switch W, FIG. 3C, and from said contacts through conductor 11 to the differential output—base of Q18—and through diode CR10 to the base of Fet Q21.

The drain electrode of Q22 is connected by conductor 7 to the second row of stationary contacts of switch W FIG. 3B and thence through the associated wiper to the resistor bank R in the fifth contact row of said switch which in its present position "Pico FDS" is resistor R74. The opposite end of said resistor R74, as are each of the remaining resistors R75–R80 inclusive in said contact row, is connected to the instrument or chassis ground.

Resistor R81 is seen to be connected at one end to the wiper ($w6$) of switch W and at its opposite end to conductor 18, said conductor connecting in turn to the input of the integration network 50.

With this circuitry, the capacitor C to be tested is alternately connected by Fet Q21 across the output of differential amplifier Q18, Q19, Q20 wherein it is charged to the balanced output voltage level of said amplifier and thereafter by Fet Q22 across the discharge resistor as for example R74 in the "Pico FDS" range wherein the capacitor C is discharged. The voltage $E_c$ thus generated representing the magnitude of the capacitor C under test is applied via conductor 7, switch W and conductor 18, FIGS. 3A, 3B, to the input (junction of R11 and C49) of the integration network 50 where it is integrated and applied to one side V1 of the chopper 5, which comprises the input to the difference amplifier 10.

As best seen in FIG 3A, the capacitor C to be tested is connected to the terminals $T_1$ and $T_2$, and depending upon its magnitude, is cyclically connected to the standard voltage source 20 by switching Fets Q21 and Q22 or the reed relay S1. This switching circuitry connects the capacitor C to the standard voltage source 20 for one-half cycle and then to whatever discharge resistors R74–R80 are connected in circuit by switch W for the remaining half-cycle of each said cycle.

To provide for cyclically operating either the switching Fets Q21, Q22 or the reed relay S1, a frequency countdown circuit as identified in its entirety at 23 is used.

As seen in FIG. 3B, the frequency countdown circuit 23 consists of four free running unijunction relaxation oscillators Q26–Q29 which are synchronized together. The first free running oscillator (Q26) operating at about 5000 cycles per second as determined by resistors R95, R96 and R97 and capacitor C36 determines the frequency of the total countdown circuit. The next stage (Q27) operating at 500 cycles per second as determined by resistors R102, R103 and R104 and capacitor C37 divides Q26's frequency by 10. The following stage (Q28) operates to 50 cycles per second as determined by resistors R109, R110 and R111 and capacitor C38 divides Q27's frequency by 10 and the last stage Q29 divides oscillator Q28's frequency by 10 and the last stage Q29 divides oscillator Q28's frequency by 5. The last stage Q29 also provides a sync pulse to the display and gate time generator 35 as will be hereinafter described.

With the switch W in the "Pico FDS" position as shown in FIGS. 3B, 3C the oscillator Q26 is connected by conductor 60 throuhg movable wiper contact $w11$, conductor 6 to the input (base circuit) of the flip-flop Q23, Q24 whereby the same is alternately fired, the frequency of which is one-half the frequency of the oscillator Q26.

The flip-flop circuit Q23, Q24, as seen in FIG. 3A, is connected to the base circuits of the switching Fets Q21, Q2 and is operative to alternately fire the same to, in turn, alternately charge and discharge the capacitor C under test as above described.

With the switch W in the "Nano FDS" range as seen in FIG. 3B in which there are three switch positions and more particularly with the switch W in the second switch position the oscillator Q27 is also connected by conductor 61, wiper contact $w11$ and conductor 6 to the flip-flop Q23, Q24.

It will be noted in FIG. 3B that when switch W is switched from its "Pico FDS" range to the first position in the "Nano FDS" range, the oscillator Q26 remains connected to the flip-flop Q23, Q24. This is to enable the operator to have a certain degree of overlap of said ranges to thereby accommodate values of capacitors that may be close to the limit of either adjoining range and which may be measured in either of said range.

The same range overlap occurs between the "Nano FDS" and "Micro FDS" switch ranges wherein with the switch W in its last position in the "Nano FDS" range, oscillator Q28 is operable to alternately fire the switching Fets Q21, Q22.

With the switch W moved to the first position in the "Micro FDS" range, oscillator 28 continues to actuate flip-flop circuit Q23, Q24. However, as seen in FIG. 3A, said flip-flop circuit also actuates amplifier Q25.

As seen in FIGS. 3A and 3C, when switch W is in the "Pico FDS" and "Nano FDS" ranges which comprise the top four switch positions, the base of amplifier Q25 is connected to the instrument ground through conductor 5, switch wiper contact W12 and ground conductor 67. In this manner, amplifier Q25 is inoperative in these ranges.

When the switch W is in the "Micro FDS" range (fifth switch position from the top as seen in FIG. 3B) the wiper contact $w12$ and likewise the base of Q25 are disconnected from the instrument ground. As a result, amplifier Q25 is fired or pulsed once per cycle of operation of the flip-flop Q23, Q24 whereby to energize the coil of the reed relay S1 in its collector circuit and move its contact $s_1$ connected to terminal $T_1$ to its alternate or capacitor C discharge position to connect said terminal $T_1$ to conductor 9 and through switch wipers $w2$ and $w5$ to the connected resistor (R76–R80) whereby to discharge the capacitor C under test.

The contact $s_1$ of reed relay $S_1$ as shown in FIG. 3A, is in the capacitor charge position whereby the standard voltage source is taken through conductor 11, switch wiper $w10$, conductor 8, relay contact $s_1$ to terminal $T_1$ effective to charge the capacitor C under test.

As the switch W is moved through its "Micro FDS" range (three positions), the oscillator Q28 operates to cycle the flip-flop circuit Q23, Q24.

With switch W moved to its "Milli FDS" range, (bottom switch position in FIG. 3B), the oscillator Q29 is connected through conductor 63 and wiper contact $w11$ to the flip-flop circuit Q23, Q24 and is operable to cycle said circuit whereby its frequency is one-half the frequency of said oscillator Q29.

An adjustable resistor R55 connected across the −20 volt supply and the base circuit of Q18 provides a negative voltage which is impressed across the capacitor discharge resistor for the range in use. This is used to remove the effect of lead and any test set-up stray capacitances which may occur when using the instrument in the low ranges, namely the picofarad and X.XX nanofarad ranges.

As aforementioned, the voltage signal as is identified as $E_c$ is combined with a feedback voltage $E_f$ from the frequency-to-direct current converter 17 whereby the difference voltage signal $(E_c-E_f)$ is applied to the amplifier 10.

A chopper 51 comprising a pair of high speed photo resistors V1 and V2 are connected in series to each other and across the amplifier input and function to change the direct-current signal input to the amplifier 10 into an alternating current signal.

The photo resistors V1 and V2 are optically coupled by any suitable light transmitting means, such as a Lucite tubular pipe or the like as is diagrammatically indicated by the dotted lines "OC" to a neon tube multivibrator comprising neon tubes V5 and V6 which are connected across load resistors R40, R52 respectively in the collector circuit of transistors Q14 and Q17.

As illustrated, the multivibrator comprising Q14–Q17 is conventional in circuit configuration being connected across the chassis ground and suitable voltage sources as indicated at +190 and +20 volts. The multivibrator is an astable or a free running oscillator in operation, the frequency of oscillation thereof being determined, as will be understood, by variable load resistor R48. Resistor R49 connected across the multivibrator functions to establish the range of adjustment for the frequency control of resistor R48.

In the circuit configuration as herein shown the preferred frequency of oscillation for the multivibrator is approximately 135 cycles per second whereby it is insensitive to 60 cycle transients. With the multivibrator thus oscillating, neon tubes V5, V6 are alternately illuminated whereby the light emanating therefrom is transmitted by the aforementioned opitcal coupling to, in turn, alternatively activate the photo resistors V1, V2.

The alternate activation of resistors V1, V2 converts the input voltage signal $(E_c-E_f)$ across the input of amplifier 10 into a corresponding alternating current signal which is then coupled by capacitor C10 to the first stage Q5 of direct coupled amplifier 10.

As shown in FIG. 3A, the amplifier 10 has four stages of amplification, the 2nd, 3rd, and 4th stages comprising conventional NPN transistor amplifiers Q7, Q8 and Q9 respectively connected in cascade grounded emitter configuration. The first stage comprises a field effect transistor (FET) Q5 used to provide the amplifier with a high impedance input, and which is direct coupled to the 2nd stage Q7. Transistor amplifier Q6 and its associate circuitry provides a suitable direct current feedback to amplifier stage Q1 to effect stability. Likewise, as will be understood the resistor and capacitor network R16, R17, C12 respectively provide suitable alternating current feedback for the AC component which also enhances stability of the amplifier. With the component values identified herein, the gain of the amplifier 10 is approximately $3 \times 10^4(E_c-E_f)$.

The signal output of amplifier 10 is coupled by capacitor C16 into a coherent demodulator 52 comprising photo resistors V3 and V4 which are also optically coupled to the aforesaid multivibrator Q14–Q17 by suitable light transmitting means such as a Lucite pipe as schematically shown at OC.

The photo resistors V3, V4 function in the same manner as resistors V1, V2 to convert the alternating current signal output of the amplifier 10 into direct current of corresponding magnitude.

The direct current signal output from demodulator 26 is then applied to an integrator circuit network 53 comprising resistor and capacitor filter components R27, R28, R29 and C18 which function to further smooth said demodulated direct current signal.

All output current from the demodulator flows through resistor R25. The voltage across R25 is then used to provide feedback through resistor R23 and conductor 60 to the base circuit of transistor Q6 of the amplifier 10. The smoothed output voltage $E_0$ of the integrator network 53 is about 4,000 times larger than the voltage $(E_c-E_f)$ appearing across the chopper V1, V2. The polarity of the output voltage $E_o$ is negative.

The filtered direct current signal appearing at point G as shown in FIG. 3B is then applied to the input of a direct current to frequency converter identified in its entirety at 15.

The input to the converter 15 comprises a differential amplifier Q10, Q11 and associated circuit components which operates to invert the negative going signal from the integrator circuit 53 to a positive going signal. As shown in FIG. 3B, the negative going signal from integrator network 53 is applied to the base electrode of transistor Q10 of the differential amplifier which causes transistor Q11 to conduct heavily.

The resultant amplified signal output from the collector electrode of transistor Q11 is then applied to the base electrode of transistor amplifier Q12.

The converter 15 also includes unijunction transistor Q13 which, with its associated circuitry, functions as an astable pulse generator. The frequency of oscillation of the pulse chain generated by pulse generator Q13, as will be understood, is determined by its timing capacitors C21 and C22 connected across its input circuit and the charging cycle of capacitor C19.

Feedback network comprising capacitor C22, resistor R34, diode CR7 and capacitor C19 connects the output of transistor amplifier Q12 back to the differential amplifier Q10, Q11. Capacitor C22 is smaller than capacitor C21 as noted hereinafter and discharges sharply to generate a negative pulse which is then rectified by diode CR7. The resulting negative direct current voltage pulse output from said diode CR7 is therefore proportional to the pulse repetition rate of the pulse generator Q13, and is used as a feedback voltage and fed back to the base electrode of transistor Q11 of the differential amplifier Q10, Q11. As seen in FIGS. 3B and 3C, this feedback voltage is applied to the upper end of capacitor C19 whereby to charge said capacitor negatively. As will be realized this effects to stabilize the frequency of operation of the direct current to frequency converter 15.

When transistor Q11 is turned on transistor Q12 is turned off, and as a result unijunction transistor Q13 turns on to provide a pulse to a flip-flop circuit comprising transistor multivibrator Q1 and Q2 which is a part of a frequency-to-direct current converter as identified at 17.

When Q13 fires, capacitor C22 discharges to provide a negative pulse through diode CR7 to the upper end of capacitor C19 which then charges to this negative potential. The voltage level of base of transistor Q11 is also lowered by this negative potential thereby cutting off said transistor Q11.

When transistor Q11 is turned off this turns on Q10 which, in turn, prevents capacitor C21 from recharging.

The circuit remains in this state until the voltage signal from integrator network 53 overcomes the negative charge on capacitor C19. When this occurs, the base potential of transistor Q11 is again raised whereby to turn on said transistor. With transistor Q11 turned on, transistor Q10 is again turned off whereby the potential on the collector of Q12 and emitter electrode of unijunction transistor Q13 begins to rise. This is delayed while capacitor C21 is charged whereupon the level of the potential of said emitter electrode is raised sufficiently to turn on unijunction transistor Q13 and as a result the cycle is repeated. The time between cycles or the time between pulses and likewise the number of pulses in the signal output from transistor Q13 is thus dependent on the charging rate of capacitor C21 which in turn is dependent upon the charging rate of capacitor C19 which is governed by the resistance R32 and the magnitude of the direct current input signal to the differential amplifier Q10, Q11.

The output signal from unijunction transistor Q13 of converter 15 is a negative going pulse which is applied via conductor 75 to a flip-flop circuit of the frequency to direct current converter 17 which comprises transistor multivibrator Q1 and Q2 connected at its output collector electrodes to the base electrodes of a pair of switching transistors Q3 and Q4.

With the application of the pulse signal from transistor generator Q13, flip-flop circuit Q1 and Q2 are alternately triggered to produce a square wave signal, as will be understood, the frequency thereof being one-half the frequency of said unijunction pulse signal of generator Q13.

The square wave pulse output of the flip-flop Q1, Q2 when applied to each base electrode of switching transistors Q3 and Q4 is effective to alternately fire said transistors Q3 and Q4.

As herein shown transistors Q3 and Q4 are each preferably metal-oxide silicon field effect transistors or Mosfet type as commonly called, so as to provide a relatively high input impedance to the flip-flop circuit, and to thereby be sufficiently insensitive to transient signals from the latter.

As seen in FIG. 3A, a plurality of capacitors C4–C7 are connected across the common connected drain and source electrodes of Q3 and Q4 and the instrument ground.

The drain electrode of Q3 is connected via conductor 76 to the remaining input to the chopper 51. The base electrode of Q4 is connected via conductor 78 to one side of the differential amplifier Q18 of the standard voltage source 20 whereby the same magnitude of voltage of said source is then applied to the capacitor C under test and to said transistor Q4 of the converter 17.

With this circuit structure, each time Q2 of the multivibrator Q1, Q2 fires, Q4 is turned on to apply the standard source voltage to the capacitors C4–C7 whereupon they are charged.

Likewise, each time Q1 of said multivibrator is fired, Q3 is turned on to connect said charged capacitors C4–C7 across resistors R7, R8 and one of the variable resistors R69–R73 depending upon the position of the range switch W. When this occurs, said capacitor C4–C7 discharge to provide a voltage pulse to the chopper which pulse is defined as voltage $E_f$.

In this manner, the voltage discharged by the capacitor C under test defined as $E_c$ and the voltage discharged by capacitors C4–C7 defined as $E_f$ each being of the same polarity are applied across the chopper (VI and V2) 51 in opposition to each other whereby the difference $(E_c-E_f)$ is then connected to the amplifier 10.

The collector electrode of transistor Q1 as best seen in FIG. 3A is also connected by conductor 20 to the base of transistor Q35 FIG. 3C connected into the instrument circuitry as an amplifier inverter.

The amplifier inverter Q35 takes the square wave produced by the flip-flop Q1, Q2 differentiates the waveform and amplifies it to provide a series of negative going pulses. The number or frequency of these pulses is one-half the frequency of the DC to frequency converter pulse output Q13 which output, in turn, is directly related to the magnitude of the voltage $E_c$ that is discharged by the capacitor C under test.

As seen in FIG. 3C, the pulse output of amplifier inverter Q35 is applied to the gate Q34 which is turned on to permit a predetermined number of said pulses to pass through conductor 85 and terminal P1 to the readout instrument FIG. 4 wherein the said pulses are digitally totalized to indicate the magnitude of the capacitor C under test.

The manner in which the counter and readout device of FIG. 4 functions to digitally totalize the pulse count is described in detail in the instruction manual published by the Hickok Electrical Instrument Company of Cleveland, Ohio and which is entitled Digital Measuring System—Main Frame DMS-3200 and therefore its operation need not be discussed herein in detail.

Suffice to say that the input pulse count is received by the input circuit of the instrument circuit of FIGURE 4 which is a Schmitt trigger. Said signals are converted into standard fast-rise pulses, one output pulse for each incoming pulse. The Schmitt trigger pulses are fed to the unit's digit "odd-even" multivibrator which changes state for each incoming pulse. This multivibrator controls odd, even drivers which, in turn, provide high voltage to the "odd" or "even" pins of the neon readout tube. In addition, each time the "odd-even" multivibrator returns to the "even" state, the buffer amplifier and pulse shaper stage amplifies and shapes a pulse which is fed to the five-stage ring counter.

For each incoming pulse from the buffer-shaper amplifier, the five-stage ring counter steps one stage forward and on the sixth pulse returns to its original state; The ring counter controls the tube drivers which, in turn, control the neon readout tube.

The readout tube is a biquinary type neon display tube. This means that the tube consists of five sets of number pairs with an odd and an even number in each pair. By controlling the number of pair pins of said readout tube a number pair to display can be chosen. Then by controlling the "odd" and "even" pins of said readout tube either the odd or the even number of the chosen number pair can be displayed, i.e., for a reading of 0 choose number 0–1 and "even" pin, thereby displaying 0.

As the five-stage ring counter steps from the 8–9 number pair to the 0–1 number pair a pulse is provided to the interstage buffer amplifier-pulse shaper of the following stage, which, in turn, provides a pulse to the succeeding "odd-even" multivibrator.

For each five pulses to the first-stage ring counter one pulse is transferred to the succeeding section, which then functions in the same manner to display a digital value.

The overrange circuit is a multivibrator which is triggered when the 100's digit five-stage ring counter steps from number pair 8–9 to number pair 0–1. This turns on the overrange indicator. A reset pulse is provided to the ring counters, "odd-even" multivibrators and overrange multivibrator by the generator Q13 through conductor 85. When a pulse is applied at this input the circuitry is set in such a state that all the readout tubes display a 0 and the overrange indicator is off.

The pulse signal output or pulse train of the amplifier inverter Q35 is permitted to pass to the counter and readout instrument, FIGURE 4, through conductor 85 as long as the transistor gate Q34 is turned off.

The gate Q34, as best seen in FIG. 3C, is connected between the output of the amplifier-inverter Q35 and a multivibrator circuit Q32, Q33 identified as the display flip-flop circuit.

The display flip-flop circuit is a monostable, flip-flop and is connected to the output of a sync gate Q31.

The sync gate Q31 is connected, in turn, to the output of the display time generator Q30. Pulses derived from the 50 c.p.s. frequency circuit countdown stage Q28 are connected by conductor 87 to the sync gate Q31. In order to reach the display flip-flop Q32, Q33 so as to trigger the same, these pulses must be allowed to pass through the sync gate Q31. The sync gate is normally closed, however a reset pulse is generated and is coupled to the gate Q31 so as to hold the gate open long enough for one pulse from the 50 c.p.s. countdown circuit to enter the display flip-flop Q32, Q33.

The reset pulse is generated by the display time generator Q30 which is a free running unijunction relaxation oscillator. It is synced to the last stage of the frequency countdown circuit Q29, the frequency of which is 10 cycles per second. The frequency of oscillation is varied by the display potentiometer Q124. When the unijunction fires at its preselected frequency a reset pulse is derived from resistor R129 that is in series with the emitter capacitor C41. This pulse is then coupled to the base electrode of the sync gate transistor Q31.

Pulses from the 50 c.p.s. countdown circuit Q28 are coupled to transistor Q33 of the display flip-flop which is normally turned-on. With the gate Q31 held open by the reset pulse, it permits a pulse from Q28 to enter normally-off side Q32 of the flip-flop, whereby the flip-flop triggers or switches to turn-on Q33. This opens the gate Q34 and permits the pulse train from the amplifier-inverter Q35 to pass to the readout unit (FIG. 4). After a period of time as is determined by the resistance Q135, capacitance C43 combination, the tenth pulse from the 60 c.p.s. countdown circuit Q28 following the initial pulse which previously triggered the flip-flop Q33, Q34 will carry Q33 into conduction and the flip-flop will return to its original state. This closes or brings the gate Q34 into conduction whereby the pulse train from Q35 is passed to the instrument ground thus ending the pulse count.

Switch S2, which is normally open, and which connects the base of Q30 to the instrument ground, may be closed whereby the 10 cycle per second pulses from countdown circuit Q29 are passed directly to the instrument ground in which case the generator Q30 is inoperative. During this interval, the pulse count from Q35 is received by the readout circuitry of FIG. 4 and may be indefinitely displayed.

The instant capacitor test instrument, with the embodiment of circuit components hereinafter tabulated, is capable of measuring the size of an unknown capacitor in the range between 1 picofarad to 10,000 microfarads within an accuracy of ±0.1% of the visual indication of the readout instrument except the millifarad range —1%.

In order to accommodate this wide range, the circuitry is selectively switched by the switch W into one of eight (8) ranges, namely 000. to 999. picofarads; 0.00 to 9.99 nanofarads; 00.0 to 99.9 nanofarads; 000. to 999. nanofarads; 0.00 to 9.99 microfarads; 00.0 to 99.9 microfarads; 000. to 999. microfarads and 0.00 to 9.99 millifarads.

In order that the instrument circuitry operate satisfactorily over this wide range, it is calibrated in each of said ranges.

This is accomplished as follows.

The capacitor test instrument is placed into operation with the readout instrument as shown in FIG. 4 and the sources of power, as indicated, are turned on.

The pulse count conductor 85 is connected to the input-count terminal of the readout instrument, and in like manner the reset pulse terminal P9 is connected to the reset terminal of said readout instrument.

The frequency countdown circuitry Q26–Q29 are each adjusted by means of its associated variable potentiometers R96, R103, R110 and R117 respectively whereby to operate at an exact frequency of 5000 cycles per second for Q26; 500 cycles per second for Q27; 50 cycles per second for Q28 and 10 cycles per second for Q29.

With the frequency countdown circuitry thus functioning properly, a suitable laboratory standard capacitor is connected to terminals $T_1$ and $T_2$. One such standard capacitor which has been used is a General Radio Standard Decade Capacitor having selected capacitance values in the range 100 picofarad to 1.111 microfarad ±.05%.

The standard capacitor is set to a value of capacitance preferably in an intermediate range for the instrument which value represents a full scale reading for the range selected such as 99.9 nanofarads full scale reading for the XX.X nanofarad range, and the actual reading that is indicated on the readout instrument of FIG. 4 is then noted.

The values of the capacitances C5, C6 and C7 are then selected and inserted in parallel with capacitor C4 in the frequency to direct current converter 17 and resistor R70 is adjusted so that the actual reading obtained on the FIG. 4 instrument is 99.9±0.1%.

The adjustment of R70, as will now be understood, regulates the rate of discharge of capacitors C4–C7 in the converter 17 which provides the feedback voltage $E_f$ that is combined with the voltage $E_c$ generated by the unknown capacitor under test or in the calibration of the instrument the known value of the capacitor which, in turn, is directly related to the magnitude of the said capacitor under test.

In this manner, the pulse output E of the direct current to frequency converter 15 provides the proper number of pulses to accurately identify the magnitude of the capacitor under test.

Capacitor C4 has a sufficient value of capacitance to enable the instrument to operate satisfactorily throughout its complete range whereby capacitors C5–C7 are used as trimmer capacitors to bring the operation of the converter 17 within the desired tolerances of accuracy.

The same procedure is followed for each of the remaining ranges of operation for the instrument, the associated variable resistor R69 for the picofarad range; R71, R72, R73 for the appropriate microfarad ranges. Said variable resistors are adjusted to provide in each range an accurate full scale reading on the instrument of FIG. 4 within the accuray of ±0.1% of the desired full scale reading. The millifarad range accuracy is determined by the adjusted value of R73 and the actual value of R79. This will be no worse than ±1% of desired full scale value.

As will be recalled, the variable resistors R69–R73 are each connected across its associated capacitor discharge resistor comprising resistor bank R74–R81 thereby providing a sufficient adjustment to the resistor value in order, in turn, to provide a proper value of capacitor discharge voltage $E_c$.

Inasmuch as the operation of the instrument circuitry is linear throughout each range and is also especially designed to be linear at approximately 40% overrange accepting the XXX microfarad and X.XX millifarad ranges in which overrange operation is not provided, the calibration of the circuitry at full scale reading or deflection in each range assures correct measurement of lesser values of capacitance in each range.

COMPONENT LIST

C=Capacitor
R=Resistor
Q=Transistor
S=Switch
V=Photocell

| Ref. No.: | Name and description |
|---|---|
| C1 | Capacitor, fixed, ceramic: 100 pf., 20%, 500 v. |
| C2 | Capacitor, fixed, ceramic: 470 pf., 20%, 500 v. |
| C3 | Same as C1. |
| C4 | Capacitor, fixed: 5000 pf., ±1%, radial leads, cement insulated. |
| C5 | Capacitor, fixed, polystyrene: Calibration, 10%, 160 v., exact value determined in production. |
| C6 | Same as C5. |
| C7 | Same as C5. |
| C8 | Capacitor, fixed, polycarbonate film: .1 µf., 10%, 400 v. |
| C9 | Same as C8. |
| C10 | Capacitor, fixed, polycarbonate film: .01 µf., 10%, 400 v. |
| C11 | Capacitor, fixed, ceramic: 470 f., 20%, 500 v. |
| C12 | Capacitor, fixed, electrolytic: 100 µf., 20%, 12 v. |
| C13 | Same as C2. |
| C14 | Capacitor, fixed, ceramic: 330 pf., 20%, 500 v. |
| C15 | Same as C14. |
| C16 | Capacitor, fixed, polyester film: .47 µf., 10%, 200 v. |
| C17 | Capacitor, fixed, electrolytic: 150 µf., 3 v. |
| C18 | Capacitor, fixed, polyester film: .047 µf., 10%, 200 v. |
| C19 | Capacitor, fixed, polyester film: .1 µf., 10%, 200 v. |
| C20 | Capacitor, fixed, ceramic: 1000 pf., +50%−20%, 500 v. |
| C21 | Same as C2. |
| C22 | Same as C1. |
| C23 | Same as C18. |
| C24 | Capacitor, fixed, polyester film: .22 µf., 10%, 200 v. |
| C25 | Capacitor, fixed, polyester film: .022 µf., 10%, 200 v. |
| C26 | Same as C25. |
| C27 | Same as C24. |
| C28 | Capacitor, fixed, electrolytic: 22 µf., 6 v., tolerance 10% to +100%, axial wire leads. |
| C29 | Capacitor, fixed, polyester film: .01 µf., 10%, 200 v. |
| C30 | Same as C19. |
| C31 | Capacitor, fixed, polycarbonate film: .22 µf., 10%, 400 v. |
| C32 | Same as C20. |
| C33 | Same as C14. |
| C34 | Same as C2. |
| C35 | Same as C14. |
| C36 | Same as C29. |
| C37 | Same as C29. |
| C38 | Same as C19. |
| C39 | Same as C24. |
| C40 | Capacitor, fixed, electrolytic: tantalum, 5.0 µf., 20%, 20 v., epoxy case. |
| C41 | Same as C24. |
| C42 | Same as C29. |
| C43 | Same as C16. |
| C44 | Capacitor, fixed, ceramic: .0047 µf., +50%−20%, 500 v. |
| C45 | Same as C1. |
| C46 | Same as C20. |
| C47 | Capacitor, fixed, ceramic: 22 pf., 20%, 500 v. |
| C48 | Capacitor, fixed, polyester film: 1 µf., 10%, 200 v. |
| C49 | Capacitor, fixed, polycarbonate film: .047 µf., 10%, 400 v. |
| CR1 | Semi-conductor device, diode: 1N914. |
| CR2 | Same as CR1. |
| CR3 | Semi-conductor device, germanium diode: 20 v., PIV, 1N695. |
| CR4 | Same as CR3. |
| CR5 | Same as CR1. |
| CR6 | Same as CR1. |
| CR7 | Same as CR1. |
| CR8 | Same as CR1. |
| CR9 | Semi-conductor device, Zener diode: 6.8 v., ±5%, 1N710A. |
| CR10 | Same as CR3. |
| CR11 | Same as CR3. |
| CR12 | Same as CR1. |
| CR13 | Same as CR1. |
| CR14 | Same as CR1. |
| CR15 | Same as CR1. |
| CR16 | Same as CR1. |
| CR17 | Same as CR1. |
| CR18 | Same as CR1. |
| CR19 | Same as CR1. |
| CR20 | Same as CR1. |
| CR21 | Same as CR1. |
| Q1 | Transistor: 2N3566 NPN silicon general purpose. |
| Q2 | Same as Q1. |
| Q3 | Transistor: FET 2N4304N channel. |
| Q4 | Same as Q3. |
| Q5 | Transistor: Mosfet (Amplifier). voltage. |
| Q6 | Same as Q1. |
| Q7 | Same as Q1. |
| Q8 | Same as Q1. |
| Q9 | Transistor: 40354 NPN silicon high voltage. |
| Q10 | Same as Q1. |
| Q11 | Same as Q1. |
| Q12 | Same as Q1. |
| Q13 | Transistor: Unijunction 2N4852. |
| Q14 | Transistor: A130 NPN silicon high voltage. |
| Q15 | Same as Q1. |
| Q16 | Same as Q1. |
| Q17 | Same as Q14. |
| Q18 | Transistor: Differential pair, NPN silicon A646. |
| Q19 | Transistor: 2N3638 PNP silicon general purpose. |
| Q20 | Same as Q19. |
| Q21 | Same as Q3. |
| Q22 | Same as Q3. |
| Q23 | Same as Q1. |
| Q24 | Same as Q1. |
| Q25 | Same as Q1. |
| Q26 | Same as Q13. |
| Q27 | Same as Q13. |
| Q28 | Same as Q13. |
| Q29 | Same as Q13. |
| Q30 | Same as Q13. |
| Q31 | Same as Q1. |
| Q32 | Same as Q1. |
| Q33 | Same as Q1. |
| Q34 | Transistor: 2N3640 PNP silicon high frequency. |
| Q35 | Same as Q1. |
| R1 | Resistor, fixed, composition: 12K ohms, 10%, ½ w. |
| R2 | Resistor, fixed, composition: 100K ohms, 10%, ½ w. |
| R3 | Same as R1. |
| R4 | Same as R2. |

| Ref. No.: | Name and description |
|---|---|
| R5 | Resistor, fixed, composition: 10K ohms, 10%, ½ w. |
| R6 | Resistor, fixed, composition: 220 ohms, 10%, ½ w. |
| R7 | Resistor, fixed, wire wound: 1.04K ohms, ±.5%, ±20 p.p.m. temp. coeff. |
| R8 | Resistor, fixed, metal film: 10K ohms, 10%, ½ w. |
| R9 | Resistor, fixed, composition: 5.6K ohms, 10%, ½ w. |
| R10 | Same as R6. |
| R11 | Resistor, fixed, composition: 470K ohms, 10%, ½ w. |
| R12 | Same as R2. |
| R13 | Resistor, fixed, composition: 270K ohms, 10%, ½ w. |
| R14 | Resistor, fixed, composition: 3.3 megohms, 10%, ½ w. |
| R15 | Same as R5. |
| R16 | Resistor, fixed, composition: 820K ohms, 10%, ½ w. |
| R17 | Resistor, fixed, composition: 10 ohms, 10%, ½ w. |
| R18 | Resistor, fixed, composition: 22K ohms, 10%, ½ w. |
| R19 | Resistor, fixed, composition: 56K ohms, 10%, ½ w. |
| R20 | Resistor, fixed, composition: 2.2 megohms, 10%, ½ w. |
| R21 | Resistor, fixed, composition: 8.2K ohms, 10%, ½ w. |
| R22 | Same as R2. |
| R23 | Resistor, fixed, composition: 100 ohms, 10%, ½ w. |
| R24 | Resistor, fixed, composition: 33K ohms, 10%, ½ w. |
| R25 | Resistor, fixed, composition: 47 ohms, 10%, ½ w. |
| R26 | Same as R24. |
| R27 | Resistor, fixed, composition: 1K ohms, 10%, ½ w. |
| R28 | Resistor, fixed, composition: 39K ohms, 10%, ½ w. |
| R29 | Resistor, fixed, composition: 47K ohms, 10%, ½ w. |
| R30 | Same as R13. |
| R31 | Same as R11. |
| R32 | Same as R29. |
| R33 | Resistor, fixed, composition: 1 megohms, 10%, ½ w. |
| R34 | Resistor, fixed, composition: 1.8K ohms, 10%, ½ w. |
| R35 | Resistor, fixed, composition: 15K ohms, 10%, ½ w. |
| R36 | Same as R34. |
| R37 | Same as R23. |
| R38 | Same as R29. |
| R39 | Same as R5. |
| R40 | Same as R33. |
| R41 | Same as R5. |
| R42 | Same as R5. |
| R43 | Same as R5. |
| R44 | Same as R5. |
| R45 | Resistor, fixed, composition: 620K ohms, 5%, ½ w. |
| R46 | Same as R45. |
| R47 | Same as R5. |
| R48 | Resistor: variable, wire wound: 10K ohms, 20%, 2 w. |
| R49 | Same as R5. |
| R50 | Same as R5. |
| R51 | Same as R5. |
| R52 | Same as R33. |

| Ref. No.: | Name and description |
|---|---|
| R53 | Same as R48. |
| R54 | Resistor, fixed, composition: 27K ohms, 10%, ½ w. |
| R55 | Resistor, variable, composition: 25K ohms, 20%, ½ w., linear taper. |
| R56 | Resistor, fixed, composition: 22 megohms, 10%, ½ w. |
| R57 | Same as R56. |
| R58 | Same as R2. |
| R59 | Resistor, fixed, composition: 4.7K ohms, 10%, ½ w. |
| R60 | Resistor, fixed, composition: 470 ohms, 10%, ½ w. |
| R61 | Same as R59. |
| R62 | Same as R59. |
| R63 | Resistor, fixed, composition: 6.8K ohms, 10%, ½ w. |
| R64 | Same as R27. |
| R65 | Resistor, fixed, composition: 56 ohms, 10%, ½ w. |
| R66 | Resistor, fixed, composition: 33 ohms, 10%, ½ w. |
| R67 | Resistor, fixed, composition: 1.2K ohms, 10%, ½ w. |
| R68 | Resistor, fixed, composition: 120 ohms, 10%, ½ w. |
| R69 | Resistor, variable, wire wound, 2K ohms, 20%, 2 w. |
| R70 | Same as R69. |
| R71 | Same as R69. |
| R72 | Same as R69. |
| R73 | Same as R69. |
| R74 | Resistor, fixed, wire wound: 10K ohms, ±.5%, ±20 p.p.m. temp. coeff. |
| R75 | Resistor, fixed, wire wound: 1K ohms, ±.1%, ±20 p.p.m. temp. coeff. |
| R76 | Resistor, fixed, wire wound: 100 ohms, ±.5%, ±20 p.p.m. temp. coeff. |
| R77 | Resistor, fixed, wire wound: 10 ohms, ±.5%, ±20 p.p.m. temp. coeff. |
| R78 | Resistor, fixed, wire wound: 1 ohm, ±.5%, ±20 p.p.m. temp. coeff. |
| R79 | Same as R78. |
| R80 | Same as R14. |
| R81 | Same as R11. |
| R82 | Same as R60. |
| R83 | Same as R6. |
| R84 | Same as R2. |
| R85 | Same as R1. |
| R86 | Same as R5. |
| R87 | Same as R6. |
| R88 | Resistor, fixed, composition: 220 ohms, 10%, ½ w. |
| R89 | Same as R2. |
| R90 | Same as R59. |
| R91 | Same as R9. |
| R92 | Same as R21. |
| R93 | Resistor, fixed, composition: 18K ohms, 10%, ½ w. |
| R94 | Same as R27. |
| R95 | Resistor, fixed, metal film: 20.1K ohms, 1%, ½ w. |
| R96 | Same as R48. |
| R97 | Resistor, fixed, metal film: 40.2K ohms, 1%, ½ w. |
| R98 | Resistor, fixed, composition: 5%, ½ w., calibration, exact value determined in production. |
| R99 | Same as R25. |

| Ref. No.: | Name and description |
|---|---|
| R100 | Resistor, fixed, composition: 22 ohms, 10%, ½ w. |
| R101 | Same as R23. |
| R102 | Resistor, fixed, metal film: 15K ohms, 1%, ½ w. |
| R103 | Same as R48. |
| R104 | Resistor, fixed, metal film: 549K ohms, 1%, ½ w. |
| R105 | Resistor, fixed, composition: 5%, ½ w., exact value determined by unijunction transistor vendor. |
| R106 | Same as R25. |
| R107 | Same as R100. |
| R108 | Same as R23. |
| R109 | Same as R102. |
| R110 | Same as R48. |
| R111 | Same as R104. |
| R112 | Same as R25. |
| R113 | Same as R100. |
| R114 | Same as R105. |
| R115 | Same as R23. |
| R116 | Same as R97. |
| R117 | Same as R48. |
| R118 | Same as R104. |
| R119 | Same as R105. |
| R120 | Same as R25. |
| R121 | Same as R25. |
| R122 | Same as R23. |
| R123 | Same as R2. |
| R124 | Resistor, variable, composition: 1 megohm, 20%, 1 w., linear taper, with S.P.S.T. switch "Pull to Close." |
| R125 | Resistor, fixed, composition: 150 ohms, 10%, ½ w. |
| R126 | Same as R5. |
| R127 | Same as R27. |
| R128 | Same as R24. |
| R129 | Resistor, fixed, composition: 390K |
| R130 | Same as R27. ohms, 10%, ½ w. |
| R131 | Same as R5. |
| R132 | Same as R29. |
| R133 | Same as R2. |
| R134 | Same as R18. |
| R135 | Same as R104. |
| R136 | Same as R48. |
| R137 | Same as R95. |
| R138 | Same as R24. |
| R139 | Same as R2. |
| R140 | Same as R35. |
| R141 | Same as R18. |
| R142 | Same as R2. |
| R143 | Resistor, fixed, composition: 2.2K ohms, 10%, ½ w. |
| R144 | Same as R18. |
| R145 | Same as R59. |
| R146 | Resistor, fixed, composition: 3.3K ohms, 10%, ½ w. |
| R147 | Same as R28. |
| S1 | Relay: reed, miniature size. |
| S2 | Part of R124. |
| S3 | Switch: rotary, range. |
| V1 | Cell: photo, selected. |
| V2 | Same as V1. |
| V3 | Same as V1. |
| V4 | Same as V1. |
| V5 | Lamp: NE2U, aged and selected. |
| V6 | Same as V5. |

What is claimed is:

1. A digital instrument for measuring capacitance comprising terminal means for connection to a capacitor of unknown magnitude, first circuit means connecting to said terminal means being operable to periodically charge and discharge said capacitor and provide a discharge voltage that is representative of the magnitude of said capacitor, amplifier means operatively connected to said first circuit means, first converter means connected to said amplifier means being operable to convert a first direct current signal from said amplifier means into a pulsating signal having a frequency that is proportional to the magnitude of said first discharge voltage, second converter means connected to said first converter means being operable to convert said pulsating signal into a second direct current signal, second circuit means for connecting said second direct current signal to said amplifier means in opposition to said discharge voltage effective to provide therebetween a difference signal which is applied to said amplifier means, said amplifier means being operable to amplify said difference signal and provide said first direct current signal, and output circuit means for connecting said pulsating signal from said first converter means to a digital counter circuit.

2. A digital instrument as is defined in claim 1 and wherein the first circuit means includes switching means which are alternately actuated into two positions effective to charge and then discharge the capacitor connected to the terminal means.

3. A digital instrument as is defined in claim 1 and wherein the first circuit means includes a source of electrical energy that is periodically connected across the capacitor effective to charge said capacitor.

4. A digital instrument as is defined in claim 1 and wherein the first circuit means includes impedance means that are periodically connected across the capacitor effective to discharge said capacitor.

5. In a digital instrument as is defined in claim 1 and wherein control means operatively connected to said first circuit means and said output circuit means are effective to regulate the operation of said connected circuit means with respect to each other.

6. In a digital instrument as is defined in claim 3 and wherein the source of electrical energy is operatively connected to the second converter means.

7. In a digital instrument as is defined in claim 5 and wherein the control means regulates the frequency of said connected circuit means.

8. In a digital instrument as is defined in claim 7 and wherein the control means regulates the frequency of the connected circuit means in an inverse relation with respect to each other.

9. In a digital instrument as is defined in claim 7 and wherein the control means includes frequency responsive circuit means operable at a plurality of different frequencies.

10. In a digital instrument as is defined in claim 9 and wherein switch means connected to the control means are operable to selectively actuate one of the frequency responsive circuit means to provide a regulation of the connected circuit means at a particular frequency.

References Cited

UNITED STATES PATENTS

| 2,607,528 | 8/1952 | McWhirter et al. | 235—92 |
| 2,937,369 | 5/1960 | Newbold et al. | 340—177 |
| 3,325,727 | 6/1967 | Haas | 324—60 |

FOREIGN PATENTS 662,934  3/1964  Canada.

EDWARD E. KUBASIEWICZ, Primary Examiner

U.S. Cl. X.R.

235—151.31